(12) United States Patent
Ishimitsu

(10) Patent No.: US 11,078,886 B2
(45) Date of Patent: Aug. 3, 2021

(54) WIND TURBINE GENERATOR AND METHOD OF CONTROLLING WIND TURBINE GENERATOR

(71) Applicant: MHI VESTAS OFFSHORE WIND A/S, Aarhus N (DK)

(72) Inventor: Keita Ishimitsu, Aarhus N (DK)

(73) Assignee: Vestas Offshore Wind A/S, Aarhus N. (DK)

( * ) Notice: Subject to any disclaimer, the term of this patent is extended or adjusted under 35 U.S.C. 154(b) by 0 days.

(21) Appl. No.: 17/040,371

(22) PCT Filed: Mar. 25, 2019

(86) PCT No.: PCT/EP2019/057473
§ 371 (c)(1),
(2) Date: Sep. 22, 2020

(87) PCT Pub. No.: WO2019/185560
PCT Pub. Date: Oct. 3, 2019

(65) Prior Publication Data
US 2021/0054824 A1    Feb. 25, 2021

(30) Foreign Application Priority Data
Mar. 29, 2018  (EP) .................................. 18165135

(51) Int. Cl.
*F03D 7/02*    (2006.01)
*F03D 17/00*   (2016.01)
(Continued)

(52) U.S. Cl.
CPC ............. *F03D 7/0292* (2013.01); *F03D 7/04* (2013.01); *F03D 17/00* (2016.05); *H02P 9/006* (2013.01);
(Continued)

(58) Field of Classification Search
CPC .......... F03D 7/0292; F03D 17/00; F03D 7/04; F03D 7/0296; H02P 9/006;
(Continued)

(56) References Cited

U.S. PATENT DOCUMENTS

2008/0086281 A1*  4/2008  Santos .................... F03D 7/045
                                                   702/127
2008/0136188 A1*  6/2008  Krueger .................. F03D 7/042
                                                    290/44
(Continued)

FOREIGN PATENT DOCUMENTS

EP     2302207 A1    9/2009
EP     2993344 A1    3/2016
(Continued)

OTHER PUBLICATIONS

Extended European Search Report for European Application No. 18165135.7 dated Sep. 24, 2018; 7pp.
(Continued)

*Primary Examiner* — Charles Reid, Jr.
(74) *Attorney, Agent, or Firm* — Wood Herron & Evans LLP

(57) ABSTRACT

A method of controlling a wind turbine includes: accumulating a cumulative damage degree Du of each evaluation point of the wind turbine in a unit period over an entire evaluation period, to calculate a total cumulative damage degree Dt of the entire evaluation period at each evaluation point; comparing the Dt at each of the evaluation points with a first threshold value (P*Q) and comparing an increase rate dDt/dt of Dt at each evaluation point with a second threshold value to evaluate fatigue of a part to which each evaluation point belongs; and determining an operation mode based on an evaluation result into a normal operation mode or a low-load operation mode in which an output is suppressed compared with the normal operation mode.

11 Claims, 9 Drawing Sheets

(51) Int. Cl.
  *F03D 7/04* (2006.01)
  *H02P 9/00* (2006.01)
  *H02P 101/15* (2016.01)

(52) U.S. Cl.
  CPC .... *F05B 2270/332* (2013.01); *H02P 2101/15* (2015.01)

(58) Field of Classification Search
  CPC ............ H02P 2101/15; F05B 2270/332; F05B 2270/333; F05B 2270/802; F05B 2270/309; Y02E 10/72
  USPC ..................................................... 290/44, 55
  See application file for complete search history.

(56) References Cited

U.S. PATENT DOCUMENTS

| | | | | |
|---|---|---|---|---|
| 2009/0169378 A1* | 7/2009 | Menke | ................ | F03D 7/0224 416/1 |
| 2009/0311097 A1* | 12/2009 | Pierce | .................... | F03D 7/042 416/42 |
| 2010/0074748 A1* | 3/2010 | Godsk | .................... | F03D 7/024 416/1 |
| 2010/0133818 A1 | 6/2010 | Kinzie et al. | | |
| 2011/0084485 A1* | 4/2011 | Miranda | ................ | F03D 7/042 290/44 |
| 2013/0161955 A1* | 6/2013 | Dalsgaard | ............... | F03D 7/042 290/44 |
| 2015/0159626 A1* | 6/2015 | Tarnowski | .............. | F03D 7/028 290/44 |
| 2015/0354402 A1* | 12/2015 | Ehsani | ................. | F01D 21/003 290/44 |
| 2018/0156197 A1* | 6/2018 | Spruce | .................... | F03D 7/048 |

FOREIGN PATENT DOCUMENTS

EP    3093486 A1    11/2016
WO    2017000958 A1    1/2017

OTHER PUBLICATIONS

International Search Report and Written Opinion of International Application No. PCT/EP2019/057473 dated Jun. 18, 2019; 13pp.

\* cited by examiner

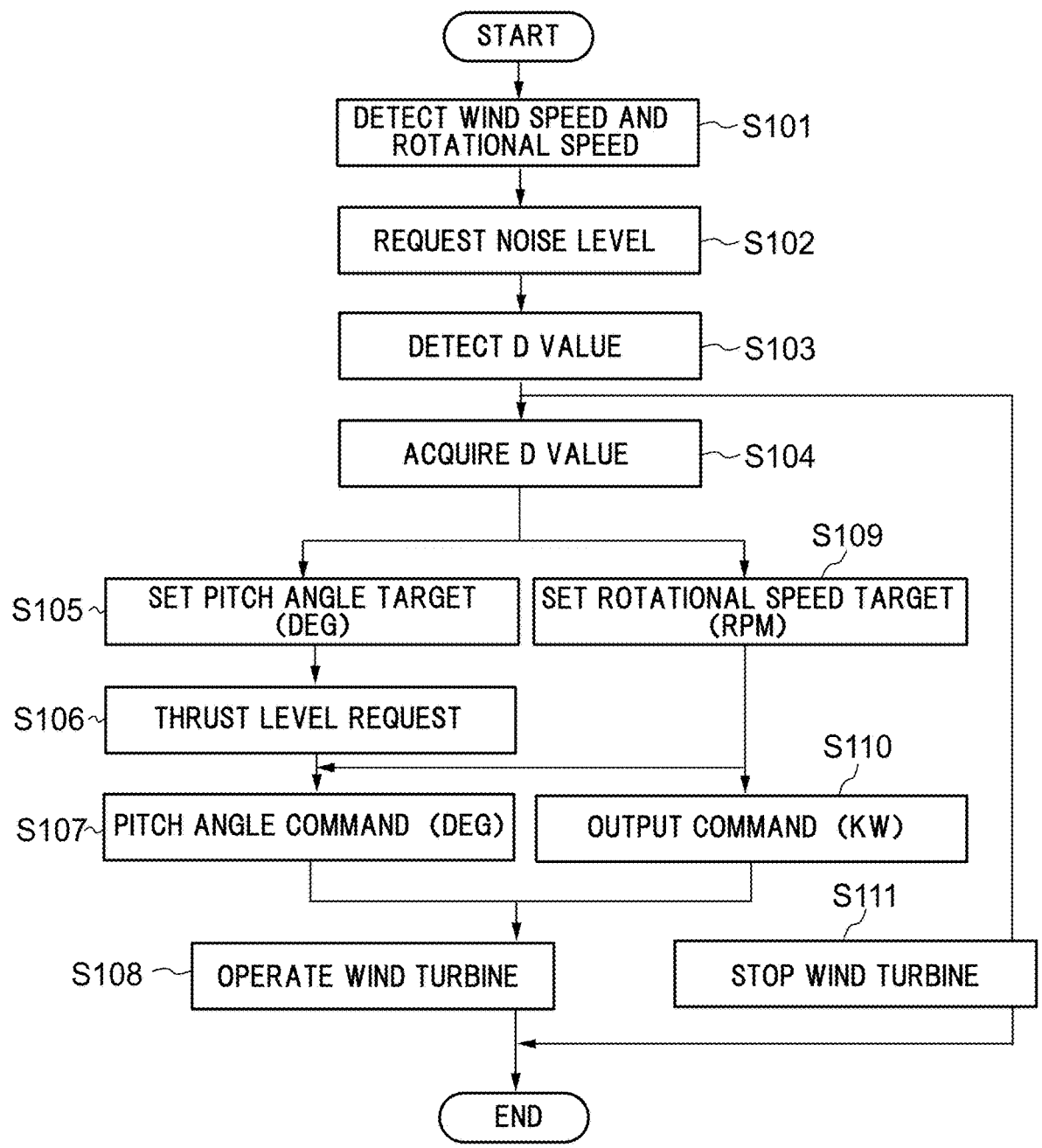

PERIOD G,K,O: NORMAL OPERATION MODE
PERIOD M : ENHANCED OPERATION MODE
PERIOD I : LOW LOAD OPERATION MODE

WIND TURBINE GENERATOR AND METHOD OF CONTROLLING WIND TURBINE GENERATOR

RELATED APPLICATIONS

The present application is a National Phase of International Application Number PCT/EP2019/057473 filed Mar. 25, 2019 and claims priority of European Application Number 18165135.7 filed Mar. 29, 2018.

TECHNICAL FIELD

This disclosure relates to a wind turbine generator and a method of controlling the wind turbine generator.

BACKGROUND

Conventionally, wind power generators that generate electricity by using wind as regeneration energy are proliferating from a viewpoint of environmental conservation. Generally, a wind power generator includes a rotor including a plurality of rotor blades for receiving wind energy, a rotor including a rotor hub, a generator to which the rotational force of the rotor is transmitted via a drive train, a nacelle that rotatably supports the rotor and accommodates the generator, and a tower that supports the nacelle.

European Patent Application Publication No. 2302207 (hereinafter referred to as Patent Document 1) describes that the fatigue life of a wind power generator is evaluated, and the wind power generator is operated in a different operation mode based on the evaluation result.

However, the above-mentioned Patent Document 1 does not specifically disclose the operation of the wind power generator considering a useful life, thus there was a problem whether the wind power generator can be adapted to the set useful life even by driving based on the fatigue life evaluation result. In addition, the useful life may exceed the original wind turbine design life years.

SUMMARY

The present invention has been made in view of the above problems, and an object of at least one embodiment of the present invention is to determine an operation level of a wind power generator according to a current driving situation and a useful life.

(1) According to at least one embodiment of the present disclosure, there is provided a method of controlling a wind turbine generator, comprising:

accumulating a cumulative damage degree Du of each evaluation point of the wind turbine generator in a unit period over an entire evaluation period, to calculate a total cumulative damage degree Dt of the entire evaluation period at each evaluation point;

comparing the total cumulative damage degree Dt at each of the evaluation points calculated by the calculation step with a predetermined first threshold value (P*Q), and comparing an increase rate dDt/dt of the total cumulative damage degree Dt at each evaluation point with a second threshold value to evaluate fatigue of a part to which each evaluation point belongs in the wind turbine generator; and determining an operation mode of the wind turbine generator based on an evaluation result of the evaluation step into a normal operation mode when the total cumulative damage degree Dt is less than the first threshold value (P*Q) and the increase rate dDt/dt is less than the second threshold value, and determining the operation mode into a low-load operation mode in which an output is suppressed as compared with the normal operation mode if the total cumulative damage degree Dt is equal to or larger than the first threshold value (P*Q) or the increase rate dDt/dt is equal to or larger than the second threshold value, wherein if the total cumulative damage degree Dt increases above the first threshold value (P*Q), the operation mode is changed to the low-load operation mode until the total cumulative damage degree Dt again is below the first threshold value (P*Q).

According to the above described method (1), when the total cumulative damage degree Dt at each evaluation point is less than the first threshold value (P*Q) and the increasing rate dDt/dt of the total cumulative damage degree Dt at each evaluation point is less than the second threshold value, it is decided to operate in the normal operation mode. On the other hand, when either the total cumulative damage degree Dt and its increase rate dDt/dt is equal to or more than the first threshold value (P*Q) or the second threshold value, it is decided to operate in the low load operation mode. Therefore, at any evaluation point, not only when the current total cumulative damage degree Dt is equal to or more than the first threshold value (P*Q) but also when the increasing rate dDt/dt of the total cumulative damage degree Dt is equal to or more than the second threshold value, it is decided to operate in the low load operation mode. Then, the wind turbine generator can be operated so that, for example, the load in the high stress region occurring in the wind turbine generator is suppressed so as to be shifted to the load in the medium stress region or the low stress region, and/or the load in the medium stress region is suppressed to shift to the load in the low stress region. Therefore, in addition to determining the current driving and load situation, the used service life is estimated, and operation of the wind turbine can be adjusted before the total cumulative damage degree Dt exceed 1 (corresponding to full service life).

(2) In some embodiment, in the above method (1), in the operation mode determination step, a pitch angle of a wind turbine blade may be set to be a feather side compared to the normal operation mode when the evaluation point belongs to any one of a top portion of a tower, a bottom portion of the tower, a rotor hub or a rotor blade of the wind turbine generator.

According to the above method (2), since the external force due to wind can be reduced, it is possible to effectively suppress the load of the high stress region at the corresponding evaluation point. Therefore, it is possible to effectively suppress the increase in the cumulative damage degree Du and to extend the life of the wind turbine generator.

(3) In some embodiment, when the evaluation point belongs to a drive train in the wind turbine generator, the rotation speed of a rotor may be limited to be lower compared to the normal operation mode.

According to the above method (3), in the above method (1) or (2), when the evaluation point mainly belongs to the power transmission system, the rotation speed is limited to a lower rotation speed than in the normal operation mode. Therefore, it is possible to effectively suppress an increase in the cumulative damage degree Du of the part related to power transmission.

(4) In some embodiment, in any one of the above method (1) to (3), the method of controlling a wind turbine generator may further comprise:

an acquisition step of acquiring stress change information indicating a time-series change of stress occurring at each evaluation point within the unit period;

a first calculation step of calculating a stress amplitude Fi of stress generated in each evaluation point in the unit period and a repetition number ni of the stress amplitude Fi based on the stress change information acquired in the acquisition step; and a second calculation step of calculating the cumulative damage degree Du of each evaluation point in the unit period based on a calculation result of the first calculation step and the information of the SN diagram corresponding to the material of each evaluation point.

According to the above described method (4), in the wind turbine generator, based on the stress amplitude Fi generated at each evaluation point in the unit period and the repetition number ni of the stress amplitude Fi and information on the SN diagram corresponding to the material of each evaluation point, it is possible to calculate an appropriate total cumulative damage degree Dt in consideration of the cumulative fatigue damage law for each evaluation point. In addition, by comparing the total cumulative damage degree Dt with the threshold value, it is possible to appropriately perform the fatigue evaluation of the part to which each evaluation point belongs based on the cumulative fatigue damage law. Therefore, for example, if it is expected that the remaining service life of the part corresponding to any evaluation point will be exhausted before the next periodic maintenance or elapse of expected turbine useful life, suppress the load on the wind turbine generator and prolong the remaining service life until next periodic maintenance or prolong turbine useful life. As a result, it is possible to prevent an unexpected operation stop due to breakage or the like of each part of the wind turbine generator.

(5) In some embodiment, in the method (4), the cumulative damage degree Du in the second calculation step may be calculated based on the following equation (i);

$$D_u = \Sigma \frac{n_i}{N_i} \quad \text{(i)}$$

wherein, Ni is a breaking repetition number corresponding to the stress amplitude Fi.

According to the above method (5), it is possible to calculate the cumulative damage degree Du in consideration of fatigue of each evaluation point totally.

(6) In some embodiment, in any one of the above method (1) to (5), in the predetermined first threshold value (P*Q), P is the fraction of service life at the time of evaluation of the wind turbine generator, and Q increases in the range of 0.05 to 0.95 depending on the cumulative operation of the wind power generation equipment.

According to the above method (6), in accordance with the cumulative operation of the wind turbine generator, the cumulative damage degree Du at each evaluation point increases, and the remaining service life is shortened. Therefore, if a certain threshold value that does not change over the entire operation period (useful life) of the wind turbine generator is used, it frequently happens that the total cumulative damage degree Dt and the increase rate dDt/dt respectively exceed the threshold values in the evaluation step, and there is a possibility that the wind turbine generator can not be operated smoothly. In this respect, by setting the threshold value as described above, it is possible to secure the operation of the wind turbine generator even if the cumulative damage degree Du and the total cumulative damage degree Dt increase in accordance with the cumulative operation.

(7) In some embodiment, in any one of the above (1) to (6), the method may further comprise a rotation speed determination step of setting the operation mode of the wind turbine generator as the normal operation mode when the rotor rotation speed (rpm) is within a noise request level range, and reduce the rotor rotation speed as the rotor rotation speed which falls within the range of the noise request level when the rotor rotation speed exceeds the noise request level range.

According to the above method (7), the wind turbine generator can be operated so that the noise level thereof is within the range of the noise request level at any time.

(8) In some embodiment, in any one of the above (1) to (7), the cumulative damage degree Du may be accumulated for each range of the stress amplitude in the SN diagram corresponding to the material of each evaluation point.

According to the above method (8), it is possible to calculate the cumulative damage degree Du by paying attention to the stress amplitude Fi to be specifically connected to each evaluation point. Therefore, the operation of the wind turbine generator can be secured so as not to exceed the breaking repetition number Ni for each stress amplitude Fi to be noticed at each evaluation point.

(9) In some embodiment, in any one of the above (1) to (8), the method of controlling a wind turbine generator may further comprise the step of determining an operation mode of the wind turbine generator based on an evaluation result of the evaluation step into an enhanced operation mode when the total cumulative damage degree Dt is less than 95% of the first threshold value (P*Q) in which the second threshold value is increased by at least 10%; preferably the enhanced operation mode is entered when the total cumulative damage degree Dt is less than 90% of the first threshold value, more preferably less than 80% of the first threshold value; preferably the second threshold value is increased by at least 20% and more preferably the second threshold value is increased by at least 50%.

(10) In some embodiment, in any one of the above (1) to (9), the method of controlling a wind turbine generator may further comprise the step of calibrating the total cumulative damage degree Dt by measuring the actual total cumulative damage of the wind turbine generator by a non-destructive technique, and adjusting the total cumulative damage degree Dt to the actual cumulative damage.

According to at least one embodiment of the present disclosure, there is provided a wind turbine generator, comprising:

a rotor configured to receive wind energy and rotate, a generator to which the rotational force of the rotor is transmitted, and a control system for realizing the control method according to any one of the above (1) to (10).

According to the above configuration (11), as described in the above method (1), it is possible to provide a wind turbine generator in which, when the total cumulative damage degree Dt at each evaluation point is less than the first threshold value (P*Q) and the increasing rate dDt/dt of the total cumulative damage degree Dt at each evaluation point is less than the second threshold value, it is decided to operate in the normal operation mode, while, on the other hand, when either the total cumulative damage degree Dt and its increase rate dDt/dt is equal to or more than the first threshold value (P*Q) or the second threshold value, it is decided to operate in the low load operation mode. At any evaluation point, not only when the current total cumulative damage degree Dt is equal to or more than the first threshold value (P*Q) but also when the increasing rate dDt/dt of the total cumulative damage degree Dt is equal to or more than the second threshold value, it is decided to operate in the low load operation mode. Then, the wind turbine generator can be operated so that, for example, the load in the high stress region occurring in the wind turbine generator is suppressed so as to be shifted to the load in the medium stress region or the low stress region, and/or the load in the medium stress region is suppressed to shift to the load in the low stress region. Therefore, in addition to determining the current driving and load situation, the used service life is estimated, and operation of the wind turbine can be adjusted before the total cumulative damage degree Dt exceed 1 (corresponding to full service life).

BRIEF DESCRIPTION OF DRAWINGS

FIG. 9 is a flowchart showing a method of controlling a wind turbine generator according to one embodiment.

DETAILED DESCRIPTION

Embodiments of the present disclosure will now be described in detail with reference to the accompanying drawings. It is intended, however, that unless particularly specified, dimensions, materials, shapes, relative positions and the like of components described in the embodiments shall be interpreted as illustrative only and not limitative of the scope of the present disclosure.

First, configuration of a wind turbine generator 1 according to at least one embodiment of the present disclosure will be described with reference to FIGS. 1 to 4.

A wind turbine generator (hereinafter referred to as "wind turbine 1") according to at least one embodiment of the present disclosure may be installed on land or offshore.

Figure 1:
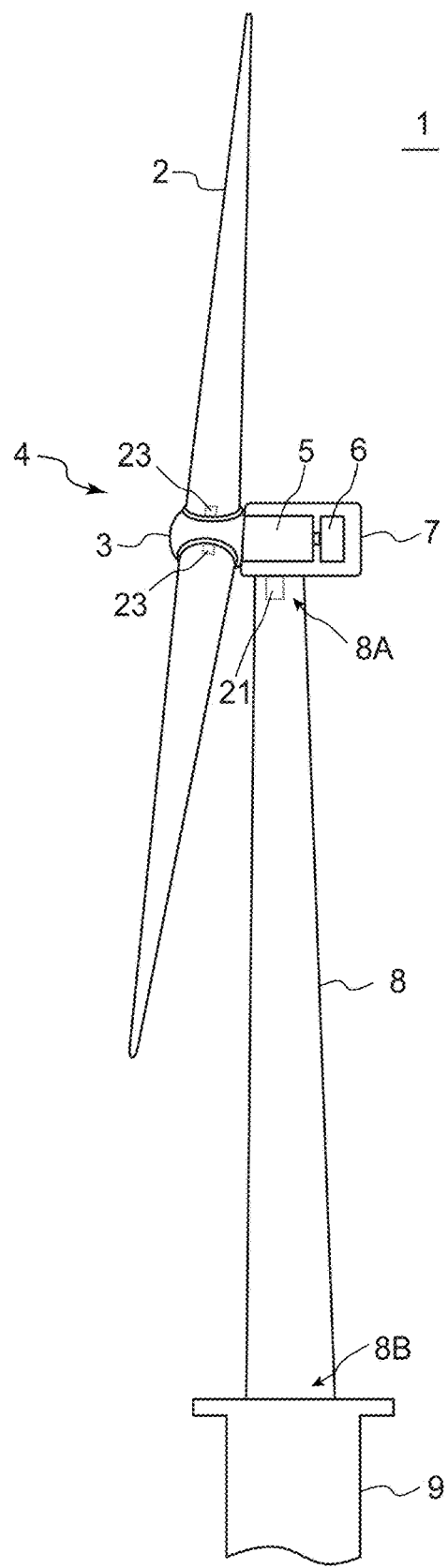
FIG. 1 is a schematic view showing a structure of a wind turbine generator according to one embodiment.
Figure 2:
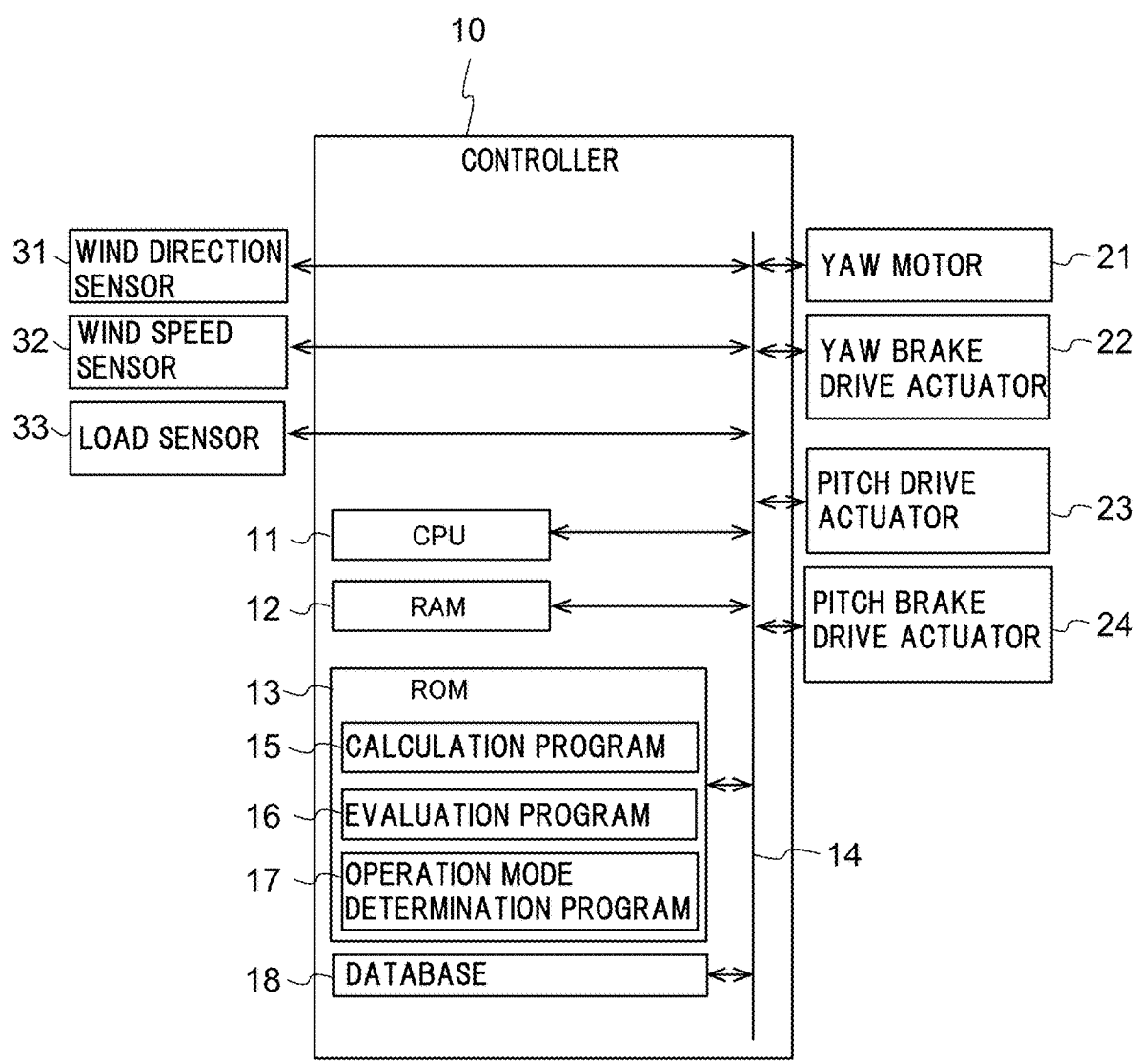
FIG. 2 is a block diagram showing a configuration of a control system in the wind turbine generator according to one embodiment.

As illustrated non-limitingly in FIGS. 1 and 2, the wind turbine 1 includes a rotor 4 configured to rotate by receiving wind energy, a generator 6 to which the rotational force of the rotor 4 is transmitted, a controller 10 (see FIG. 2) that controls each drive unit of the wind turbine 1. Further, the wind turbine 1 includes a nacelle 7 rotatably supporting the rotor 4 via a drive train constituting device 5 including a main shaft and a main bearing, a tower 8 supporting the nacelle 7 so as to be horizontally turnable, and a foundation 9 to which the tower 8 is installed.

The rotor 4 is composed of a plurality of wind turbine blades 2 and a hub 3 to which the wind turbine blade 2 is attached.

The wind turbine blade 2 is configured so that a pitch angle thereof can be adjusted by driving a pitch drive actuator 23 including, for example, a pitch motor or a hydraulic actuator that is installed in the hub 3. When the wind turbine 1 receives wind by the wind turbine blade 2, the rotor 4 rotates, and power is generated by the generator 6 connected to the rotor 4.

As exemplified non-limitingly in FIG. 2, the controller 10 is, for example, a computer, and includes a CPU 11 (processor), a ROM (read only memory) as a storage unit for storing data such as various programs executed by the CPU 11 and tables, a RAM (random access memory) 12 that functions as a work area such as a deployment area and an operation area when each program is executed, a database 18 that stores various data relating to the operation of the wind turbine 1, a nonvolatile magnetic disk storage device as a large-capacity storage device (not shown), a communication interface for connecting to a communication network, an access unit to which an external storage device is attached, and the like. All of these are connected via a bus 14, and the bus 14 is connected to each drive unit of the wind turbine 1 by wire or wireless. Further, the controller 10 may be connected to, for example, an input unit (not shown) including a keyboard, a mouse, and the like and a display unit (not shown) including a liquid crystal display device for displaying data and the like.

As shown in FIG. 2, in some embodiments, the controller 10 is configured to receive detection signals respectively related to wind direction, wind speed, load, etc. from a wind direction sensor 31, a wind speed sensor 32, and a load sensor 33 provided in each wind turbine 1. One or more of the above load sensors 33 may be installed in places such as main bearings (not shown), towers 8, and the like where loads by equipment and wind act. In some embodiments, the controller 10 may be connected to a yaw motor 21, a yaw brake drive actuator 22, a pitch drive actuator 23, a pitch brake drive actuator 24, etc. via the bus 14 and/or a signal line.

Here, with reference to FIGS. 3 to 7, a process relating to the control method of the wind turbine 1, which is realized by the controller 10 as the control unit in the wind turbine 1 according to at least one embodiment of the present disclosure, will be described.

Figure 3:
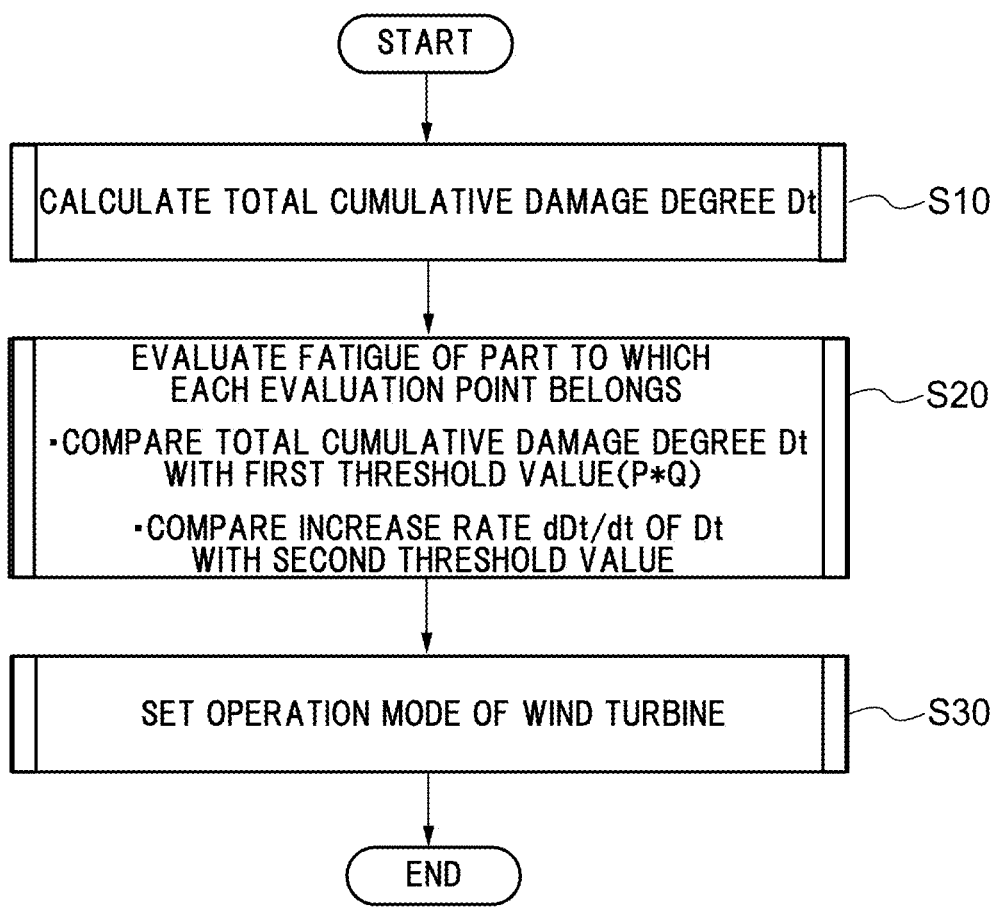
FIG. 3 is a flowchart showing a method of controlling the wind turbine generator according to one embodiment.

As illustrated non-limitingly in FIG. 3, a method of controlling a wind turbine generator according to at least one embodiment of the present disclosure includes a calculation step S10 of calculating a total cumulative damage degree Dt of an entire evaluation period at each evaluation point by accumulating a cumulative damage degree Du of each evaluation point of the wind turbine 1 in a unit period over an entire evaluation period, an evaluation step S20 of comparing the total cumulative damage degree Dt at each evaluation point calculated by the calculation step 10 with a predetermined first threshold value (P*Q) and comparing an increase rate dDt/dt of the total cumulative damage degree Dt at each evaluation point with a second threshold value to evaluate fatigue of a part to which each evaluation point belongs in the wind turbine 1, and an operation mode determination step S30 of determining an operation mode of the wind turbine 1 to be switched to a normal operation mode based on the evaluation result of the evaluation step S20 when the total cumulative damage degree Dt is less than the first threshold value (P*Q) and the increase rate dDt/dt is less than the second threshold value, and determining the operation mode of the wind turbine 1 to be determined as a low load operation mode in which an output is suppressed as compared with the normal operation mode when the total cumulative damage degree Dt is equal to or larger than the first threshold value (P*Q) or the increase rate dDt/dt is equal to or larger than the second threshold value.

Dt is normalized so Dt=1 corresponds to the total cumulative damage at failure. P is the fraction of the service life at the time of evaluation and will therefore be in the range of 0 to 1; Q is the allowed total accumulative damage at the end of service life. Q is a fraction of Dt and a design value taking into account safety margins. Typically, Q has a value of 0.10 to 0.95. It should be observed that safety margins always are a part of an engineering design but that the margin may be reduced if the variation of the value (here total accumulated damage) can be well controlled. One of the advantages of the present invention is therefore that following and being able to adjust the total accumulated damage very precisely may allow for working safely with a smaller safety margin. P*Q is in other words a measure of anticipated (or accepted) cumulative damage at a given fraction of service life.

Each of the steps S10, S20, and S30 can be realized, for example, by the CPU 11 reading out the calculation program 15, the evaluation program 16 or the operation mode determination program 17 stored in the ROM 13, loading them in the RAM 12, and executing the same (See FIG. 2).

Each evaluation point of the wind turbine 1 is assigned to a structure belonging to, for example, a power transmission system such as the wind turbine blade 2, the hub 3, the rotor 4, drive train constituting device 5, the generator 6 and the like, or a part belonging to a structure such as the nacelle 7, the tower 8. The controller 10 acquires the information obtained by the load sensor 33 such as for example a strain gauge, a piezoelectric sensor or a torque sensor provided at each of these evaluation points and executes the calculation program 15 so that the cumulative damage degree Du and the total cumulative damage degree Dt can be calculated.

As the unit period, for example, arbitrary minutes, hours, days, weeks, months, years, etc. can be set.

The total cumulative damage degree Dt (=Σni/Ni) is an index for comprehensively evaluating accumulated fatigue when stresses of various stress amplitudes Fi (i is a BIN number) occur different times (ni times). The total cumulative damage degree Dt calculated from stress amplitudes is preferably applied for Dt of for example wind turbine blade 2 and tower 8.

Further, the total cumulative damage degree Dt can be calculated from Load Revolution Distribution (LRD). The total cumulative damage degree Dt calculated from LRD is preferably applied for Dt of for example for gearbox teeth. Dt can also be calculated from Load Duration Distribution (LDD). Dt calculated from LDD is preferably applied for Dt of for example gearbox bearings.

Here, the evaluation of fatigue life will be described with reference to the S-N line diagram shown in FIG. 4.

Figure 4:
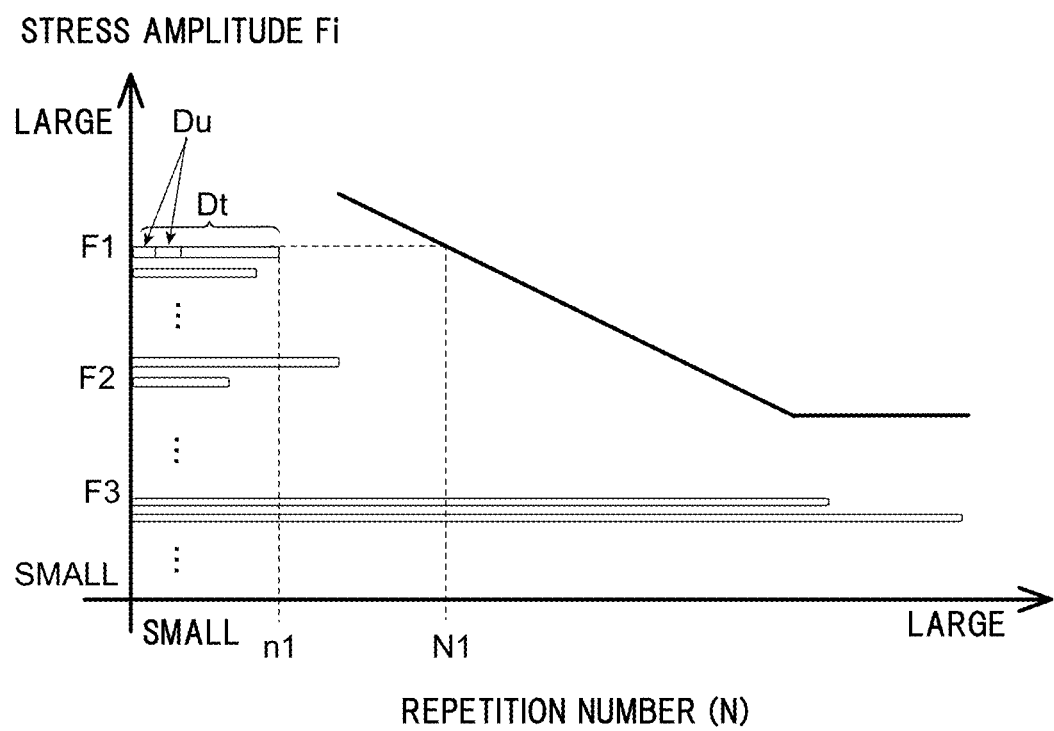
FIG. 4 is an S-N diagram showing the relationship between the stress amplitude and the repetition number in the wind turbine generator according to one embodiment.

In FIG. 4, the intersection N1 between the stress amplitude F1 and the S-N line is the number of times of repetition of the stress amplitude F1 that can withstand until the material reaches the fatigue life, which is generally called "breakage repetition number". Fatigue accumulated when stress amplitude F1 occurs n1 (<N1) times can be evaluated as n1/N1 (<1) when the fatigue life is 1.

On the other hand, if the magnitude of the stress amplitude differs, the number of repetitions ni corresponding to the same degree of fatigue life is different. In actual machines where stress magnitudes Fi of various magnitudes can be generated, when evaluating the overall fatigue which they give to fatigue of the material, breakage specified for each stress amplitude Fi by SN graph Dt=Σni/Ni calculated using the number of repetitions Ni and the number of occurrences ni of each stress amplitude Fi is obtained. When Dt (=Σni/Ni) reaches 1, it means that the lifetime of the material has been exhausted as a result of ni times of stress magnitudes Fi of various magnitudes, respectively.

According to the above configuration, when the total cumulative damage degree Dt at each evaluation point is less than the first threshold value (P*Q) and the increasing rate dDt/dt of the total cumulative damage degree Dt at each evaluation point is less than the second threshold value, it is decided to operate in the normal operation mode. On the other hand, when either the total cumulative damage degree Dt and its increase rate dDt/dt is equal to or more than the first threshold value (P*Q) or the second threshold value, it is decided to operate in the low load operation mode. Therefore, at any evaluation point, not only when the current total cumulative damage degree Dt is equal to or more than the first threshold value (P*Q) but also when the increasing rate dDt/dt of the total cumulative damage degree Dt is equal to or more than the second threshold value, it is decided to operate in the low load operation mode. Then, the wind turbine 1 can be operated so that, for example, the load in the high stress region occurring in the wind turbine 1 is suppressed so as to be shifted to the load in the medium stress region or the low stress region, and/or the load in the medium stress region is suppressed to shift to the load in the low stress region. Therefore, in addition to determining the current driving and load situation, the used service life is estimated, and operation of the wind turbine can be adjusted before the total cumulative damage degree Dt exceed 1 (corresponding to full service life). Particularly, the turbine may be operated gentler (i.e. with a lower stress region) if the total cumulative damage degree Dt is higher than anticipated considering the life (or residual service life) of the turbine. Alternatively, the turbine may be operated more aggressively if the total cumulative damage degree Dt is lower than anticipated considering the life (or residual service life) of the turbine or the turbine can be operated within the acceptable total cumulative damage degree Dt for a longer time than the normal useful life.

Figure 5:
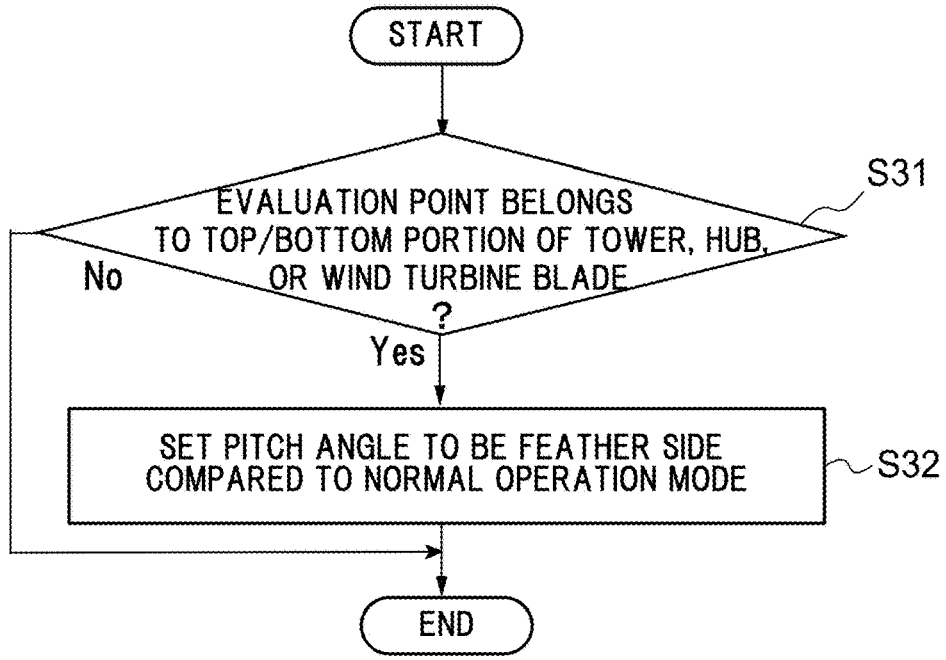
FIG. 5 is a flowchart showing a method of controlling a wind turbine generator according to another embodiment.

As non-limitingly illustrated in FIG. 5, in some embodiments, in the operation mode determination step S30, when the evaluation point belongs to any one of the top portion 8A of the tower 8 in the wind turbine 1, the bottom portion 8B of the tower 8, the hub 3 (rotor hub), or the wind turbine blade 2 (rotor blade), the pitch angle may be determined so that the pitch angle becomes the feather side than the normal operation mode.

That is, when the evaluation points belong to a structure such as the wind turbine blade 2 or the tower 8 where fatigue is accumulated mainly by receiving the wind, the pitch angle is set to be closer to the feather side than in the normal operation mode.

Specifically, the CPU 11 reads out the operation mode determination program 17 from the ROM 13, develops it in the RAM 12, and executes it to judge whether or not the evaluation point belongs to any of the top portion 8A of the tower 8, the bottom portion 8B of the tower 8, the hub 3, or the wind turbine blade 2 (step S31). When it is judged that the evaluation point belongs (step S31: Yes) to any of the above, the pitch angle of the wind turbine blade 2 is set to be the feather side compared to the normal operation mode (step S 32). On the other hand, if it is determined that the evaluation point does not belong to any of the top portion 8A of the tower 8, the bottom portion 8B of the tower 8, the hub 3, or the wind turbine blade 2 (step S 31: No), the pitch angle is not changed.

In this way, since the external force due to wind can be reduced, it is possible to effectively suppress the load of the high stress region at the corresponding evaluation point. Therefore, it is possible to effectively suppress the increase in the cumulative damage degree Du and to extend the life of the wind turbine 1.

Figure 6:
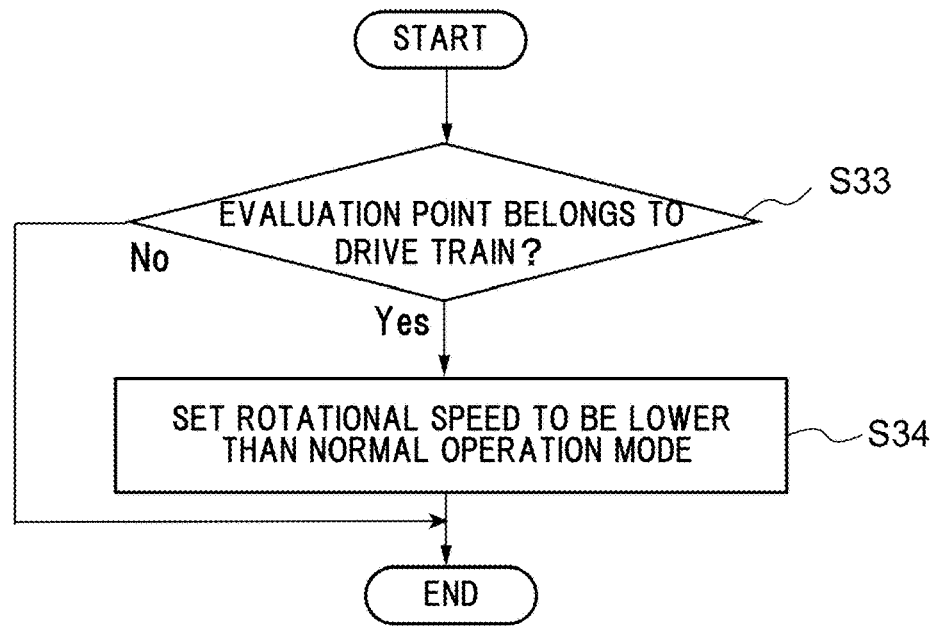
FIG. 6 is a flowchart showing a method of controlling a wind turbine generator according to another embodiment.

As exemplified non-limitingly in FIG. 6, in some embodiments, in the operation mode determination step S30, when the evaluation point belongs to a drive train (drive train constituting device 5) in the wind turbine 1, rotation speed of the rotor may be restricted to a lower rotation speed than in the normal operation mode.

That is, when the evaluation point mainly belongs to the power transmission system, the rotation speed is limited to a lower rotation speed than in the normal operation mode.

Specifically, the CPU 11 reads out the operation mode determination program 17 from the ROM 13, develops it in the RAM 12, executes it, and judges whether or not the evaluation point belongs to the drive train (step S33).

If it is determined that the evaluation point belongs to drive train (Step S33: Yes), the rotational speed of the wind turbine 1 is reduced to be lower than the normal operation mode (step S34). On the other hand, if it is determined that the evaluation point does not belong to drive train (step S33: No), the rotation speed is not changed.

In this way, it is possible to effectively suppress an increase in the cumulative damage degree Du of the part related to power transmission.

Figure 7:
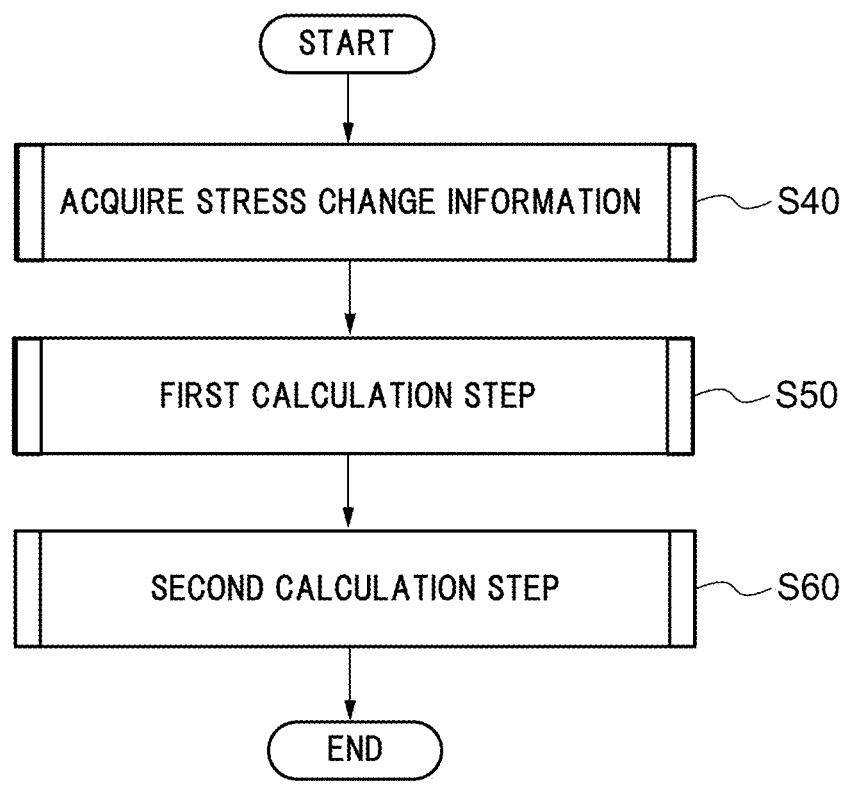
FIG. 7 is a flowchart showing a method of controlling a wind turbine generator according to another embodiment.

As illustrated non-limitingly in FIG. 7, in some embodiments, the control method of the wind turbine 1, may further include: an acquisition step S40 of acquiring stress change information indicating a time-series change of a stress occurring at each evaluation point within a unit period; a first calculation step S50 of calculating the stress amplitude Fi of the stress generated in each evaluation point in the unit period and the repetition number ni of the stress amplitude Fi based on the stress change information acquired in the acquisition step S40, and a second calculation step S60 of calculating the cumulative damage degree Du of each evaluation point in the unit period based on the calculation result of the first calculation step S50 and the information of the SN diagram corresponding to the material of each evaluation point.

In the acquiring step S40, for example, based on a detection signal transmitted from the load sensor 33 such as a strain gauge provided at each evaluation point to the controller 10, stress change information which indicates a time series change within a unit period of stress generated at each evaluation point can be obtained. On the basis of this stress change information, in the first calculation step S50, calculation of the stress amplitude Fi and its repetition number ni can be performed by the CPU 11. In step S60, on the basis of the calculation result (Fi and ni) of the first calculation step S50 and the SN diagram (stored in the ROM 13 or the database 18, for example) corresponding to the material used for each evaluation point, the cumulative damage degree Du is calculated.

According to the above configuration, in the wind turbine 1, based on the stress amplitude Fi generated at each evaluation point in the unit period and the repetition number ni of the stress amplitude Fi and information on the SN diagram corresponding to the material of each evaluation point, it is possible to calculate an appropriate total cumulative damage degree Dt in consideration of the cumulative fatigue damage law for each evaluation point. In addition, by comparing the total cumulative damage degree Dt with the threshold value, it is possible to appropriately perform the fatigue evaluation of the part to which each evaluation point belongs based on the cumulative fatigue damage law. Therefore, for example, if it is expected that the remaining service life of the part corresponding to any evaluation point will be exhausted before the next periodic maintenance or elapse of expected turbine useful life, suppress the load on the wind turbine 1 and prolong the remaining service life until next periodic maintenance or prolong turbine useful life. As a result, it is possible to prevent an unexpected operation stop due to breakage or the like of each part of the wind turbine 1.

In some embodiments, in the above described second calculation step S60, the cumulative damage degree Du may be calculated based on the following equation (i).

$$D_u = \Sigma \frac{n_i}{N_i} \quad (i)$$

Here, Ni is a breaking repetition number corresponding to the stress amplitude Fi.

According to the above configuration, it is possible to calculate the cumulative damage degree Du in consideration of fatigue of each evaluation point totally.

In some embodiments, at the above first threshold (P*Q), P is the total cumulative damage degree Dt with respect to the service life of the wind turbine generator (i.e. what total cumulative damage degree Dt is allowed at the end of the service life) and Q may be set to increase in the range of 0 to 1 according to the cumulative operation of the wind turbine 1. It is however preferred that the lower range end point is slightly above 0 to account for normal variation, such as the lower range end point being for example 0.02, 0.05 or 0.10. Similarly, it is preferred that the upper range end point is slightly below 1 as a safety factor to account for a uncertainty in calculation of cumulative damage degree, such as the upper range end point being for example 0.98, 0.95 or 0.90. Hence, in a preferred example Q may be set to increase in the range of 0.05 to 0.95 according to the cumulative operation of the wind turbine 1. It is preferred that Q increases linearly with the cumulative operation of the wind turbine 1.

In accordance with the cumulative operation of the wind turbine 1, the cumulative damage degree Du at each evaluation point increases, and the remaining service life is shortened. Therefore, if a certain threshold value that does not change over the entire operation period (useful life) of the wind turbine 1 is used, it frequently happens that the total cumulative damage degree Dt and the increase rate dDt/dt respectively exceed the threshold values in the evaluation step S20, and there is a possibility that the wind turbine 1 can not be operated smoothly. In this respect, by setting the threshold value as described above, it is possible to secure the operation of the wind turbine 1 even if the cumulative damage degree Du and the total cumulative damage degree Dt increase in accordance with the cumulative operation.

In some cases, it makes sense to accumulate cumulative damage degree Du for a number of evaluation points and evaluate the fatigue for each of these evaluation points individually. The first and second threshold values for each evaluation point may vary and particularly, P may vary for each (type of) evaluation point. It is preferred that an evaluation point corresponds to a component or a sub-component. The number of evaluation points may for example be 2, 5, 10, 20, 50, 100 or more. With more evaluation points each having accumulated cumulative damage degree Du, the option to increase the second threshold value is preferably also individual. This allows for more flexible use of "spare fatigue life" corresponding to the individual evaluation point (as a higher increase value dDt/dt is allowed win increased second threshold value) before the operation mode should be shifted to low-load operation.

In one control model, the change of mode of operation from normal to low-load (or back again) is based on at least one Dt (of any evaluation point) being above the first threshold value or the second threshold value irrespective if all other measurement points are below the first threshold value and the second threshold value. In fact, the change of mode from normal to low-load operation may take place even if threshold 2 is increased for another measurement point at the same time. In another control model, the change of mode of operation from normal to low-load is based on a group of evaluation points (such as two, three, four or more) being above the first threshold value or the second threshold value at the same time. It may be a requirement that the evaluation points forming this group should be of similar nature (e.g. evaluation point corresponding to different motors for yaw system) or of different nature (e.g. evaluation point corresponding to a yaw motor and evaluation point corresponding to component temperature or a tension sensor).

In one embodiment, at least one of the evaluation points concerns a component, which has a different lifetime than the wind turbine generator. For example, the component may need replacement one time, two times, three times, four times or more. In this case P should be the fraction of design life of the component (e.g. ½, ⅓, ¼, ⅕, or corresponding fraction of the design life of the wind turbine generator).

Figure 8:
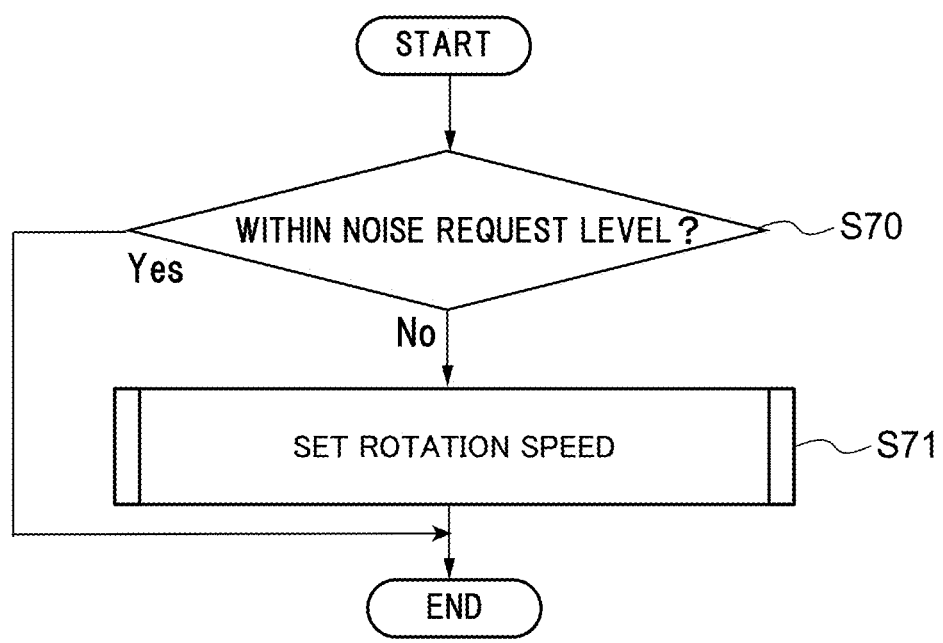
FIG. 8 is a flowchart showing a method of controlling a wind turbine generator according to another embodiment.

As illustrated non-limitingly in FIG. 8, in some embodiments, the method of controlling the wind turbine 1 may include judging whether or not the rotor rotation speed (rpm) is within the range of the noise request level (Step S70). Then, if the rotor rotation speed is within the noise request level (Step S70; Yes), the operation mode of the wind turbine 1 is set to the normal operation mode. The method may further include a rotation speed determination step S71 of determining the rotor rotation speed to be within the noise request level range if the rotor rotation speed exceeds the noise request level range (Step S70; No).

In this way, the wind turbine 1 can be operated so that the noise level thereof is within the range of the noise request level at any time.

In some embodiments, the low load operation mode may be a state in which the rotational speed or output of the rotor 4 is lowered according to the wind speed. Further, in some embodiments, the remaining lifespan R may be the difference between the useful life or the designed lifetime and the consumed life, or may be theoretically set based on past cumulative data in the wind turbine 1.

In some embodiments, the method of controlling the wind turbine 1 may be configured such that the cumulative damage degree Du is accumulated for each value range of the stress amplitude Fi in the S-N diagram corresponding to the material of each evaluation point. In this way, it is possible to calculate the cumulative damage degree Du by paying attention to the stress amplitude Fi to be specifically connected to each evaluation point. Therefore, the operation of the wind turbine 1 can be secured so as not to exceed the breaking repetition number Ni for each stress amplitude Fi to be noticed at each evaluation point.

With reference to FIG. 9, processes that may be performed by the controller 10 in some embodiments shown in this disclosure are described. If steering via fatigue, this should be an integral part of the control program. The added value of the steering via fatigue is realized by this integration with the control program, for example as integration with the noise reduction feature.

With the start of processing, the controller 10 detects the wind speed and the rotational speed of the rotor 4 (step S101). In some embodiments, independently of the above-described fatigue evaluation, the operation in the low noise operation mode is performed so that the noise level associated with the operation of the wind turbine 1 does not exceed the specified required level. That is, the controller 10 requests the noise level based on the wind speed and the rotational speed acquired (and optionally further ambient conditions) in step S101 (step S102) and determines whether or not it is necessary to reduce the noise. When it is necessary to reduce the noise, the controller 10 regulates the relationship between the wind speed and the number of revolutions, and between the wind speed and the pitch angle, and performs processing not to be changed particularly when there is no need.

Next, based on the input from the load sensor 33, the controller 10 acquires the cumulative damage degree Du (cumulative fatigue damage level: D value) using, for example, the above formula (1) (step S103). Then, based on the acquired D value, the controller 10 determines whether it is necessary to shift to the low load operation mode in which the output is suppressed in order to reduce fatigue (step S104). If the acquired fatigue level exceeds the predetermined threshold value, processing for stopping the wind turbine is performed (step S 111).

In the low load operation mode, the controller 10 sets a pitch angle target (deg) (step S105), or performs processing for setting a rotational speed target (step S109). For example, it is effective for the low load operation to control the pitch angle to the feather side within the range where the wind speed V satisfies the rated wind speed≤V≤the cut-out wind speed, therefore, the controller 10 sets the pitch angle target (deg), transmit pitch angle command to the pitch control board which controls the pitch drive actuator 23 (step S107), and the operation of the wind turbine is continued (step S108), based on the thrust level request (step S106). When setting the pitch angle target (deg), the pitch angle target may be determined with reference to the rotational speed or the output.

On the other hand, for example, it is effective for low load operation to limit the output or torque in the range where the wind speed V satisfies the cut-in wind speed≤V≤the rated wind speed, and the controller 10 sets the rotation speed target (rpm), transmit an output command (kw) or a torque command (kNm) to the output control board (step S110), and processing of the wind turbine is continued (step S108).

Determination of operation mode shall be made with appropriate interval, depending on part of wind turbine generator and environmental conditions such as wind characteristics and temperature. Determination frequency typically varies from 1 day to 6 months. Especially when Dt and/or dDt/dt are equal or larger than their threshold values, determination interval shall be shortest as reasonable.

The operator may adjust the consumption rate of the remained fatigue life of wind turbine generator by operating the wind turbine generator gentler (by reducing load) or more aggressive (by allowing higher loads) as desired for the following operational periods. This may be done by selecting appropriate Q value between 0.05 and 0.95, so that operator can produce power during the remained useful life of wind turbine generator according to operator's wind turbine utilization strategy in the lifespan of wind farm. For example, if operator selects lower Q value and keep turbine in lower load operation, then actual useful life of wind turbine generator can be longer than original design life and thus operator can operate wind turbine generator safe for longer than its original design life.

In one embodiment, the total cumulative damage degree Dt of wind turbine generator part is calibrated either up or down during the lifetime of the wind turbine generator. This calibration is preferably based on the result of non-destructive test (NDT) on a wind turbine component or by (destructive) examination of replaced parts (for example one ball of a ball bearing).

Figure 10A:
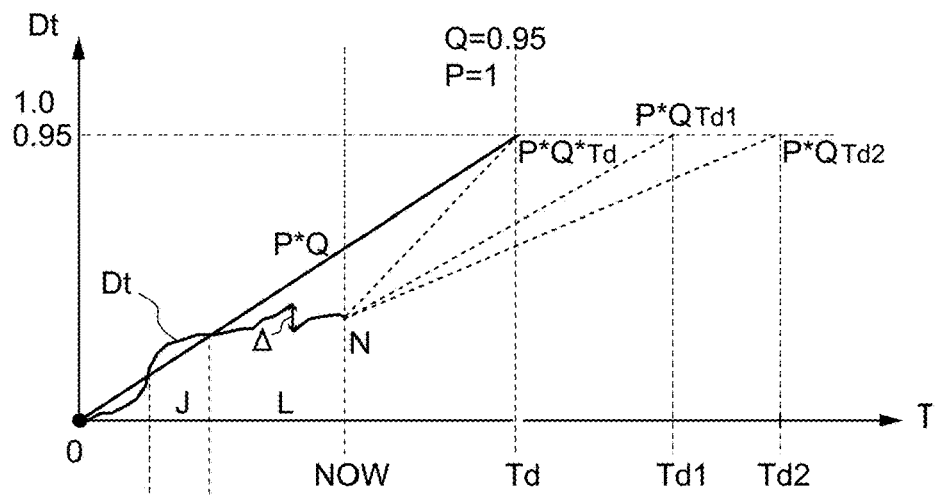
FIG. 10A is a diagram showing examples of development in total accumulative damage degree Dt.
Figure 10B:
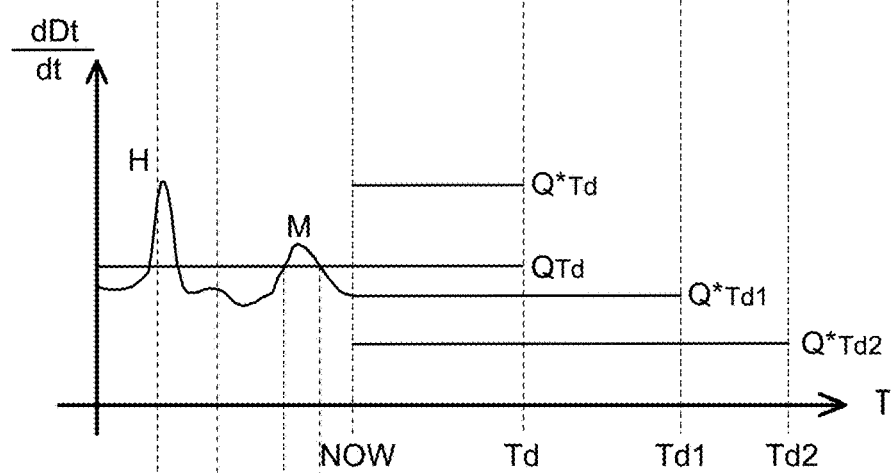
FIG. 10B is a diagram showing examples of development in rate of increase in total accumulative damage degree (dDt/dt).
Figure 10C:
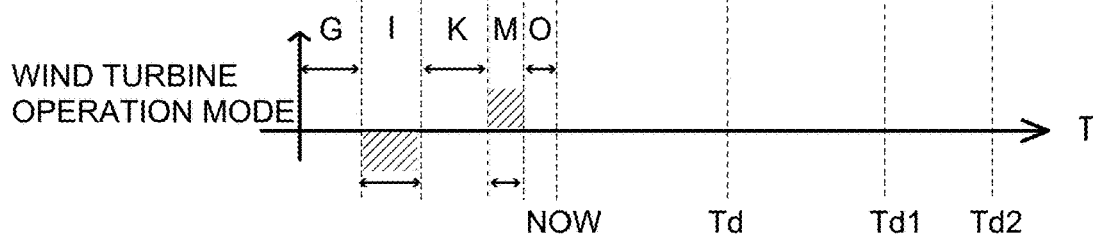
FIG. 10C is a diagram showing examples of development in operation mode.

In FIG. 10A, 10B 10C, examples of development in total accumulative damage degree Dt, rate of increase in total accumulative damage degree (dDt/dt) and operation mode is shown.

In FIG. 10A, the total accumulative damage degree Dt as a function of time is shown as well as the anticipated total cumulative damage line (P*Q) corresponding to an allowed total accumulative damage at the end of service life of $Q_{Td}=0.95$ with a service life of Td corresponding to the original design service life. It is the intention that Dt should remain below anticipated total cumulative damage line. Range G, K and O are examples of this intention. If Dt increases above the anticipated total cumulative damage line, then the increase in Dt may be kept low by changing operation mode to low load operation mode until Dt again is below the anticipated total cumulative damage line.

In FIG. 10B, a peak H in dDt/dt-line (due to an uncontrolled high damage event) pushes the Dt-line in range J (in FIG. 10A) above the anticipated total cumulative damage line corresponding to design line. Here, the response is to move to low load operation mode (as shown in FIG. 10C) in range I. In other words, the low load operation mode is used to compensate for the high damage event H, and hence allows for maintain the useful life at the level of the design life. When Dt is below the anticipated cumulative damage line, the mode of operation is changed back to normal in range K of FIG. 10C.

At time L, the total accumulative damage degree Dt is calibrated (for example by NDT technique). The calibration leads to Dt being lowered as the actual damage degree was lower than the total accumulated damage degree by an amount, A. The now lower Dt is so far below the anticipated cumulative damage line that the wind turbine generator may be operated in an enhanced operation mode where an increase in damage rate (dDt/dt) (i.e. an increase in cumulative damage degree per time) is accepted temporarily or permanently. In FIG. 10 A, 10B 10C, the enhanced mode of operation is used for period M. This may for example be advantageous if a high energy requirements event happens (neighboring energy plant is down due to maintenance or energy prices are high enough to justify higher damage to the wind turbine) or (as here) if the total cumulative damage degree Dt is lower than anticipated total cumulative damage line (P*Q).

At time N (now), the future mode of operation may be selected. Considering that the total cumulative damage degree Dt is below the anticipated cumulative damage line (P*Q), it may be decided to aim for the original service life corresponding, which allows to steer along an adjusted allowed anticipated cumulative damage line P*Q*T$_d$ and hence provide room for operating the wind turbine generator more aggressively. This is for example visible in FIG. 10B where a new acceptable level of dDt/dt for Q*Td is above the level of $Q_{Td}$ (the original acceptable level). Alternatively, the service life may be extended to Td$_1$ or Td$_2$ as shown in FIG. 10A. Here, additional P*Q curves are shown corresponding to the updated first thresholds as discussed above. Similarly, additional corresponding examples of new acceptable levels of dDt/dt for Qui and $Q_{Td2}$ are shown in FIG. 10B.

In one embodiment, the method of controlling a wind turbine generator may further comprise the step of determining an operation mode of the wind turbine generator 1 based on an evaluation result of the evaluation step into an enhanced operation mode when the total cumulative damage degree Dt is less than 95% of the first threshold value (P*Q) in which the second threshold value is increased by at least 10%; preferably the enhanced operation mode is entered when the total cumulative damage degree Dt is less than 90% of the first threshold value, more preferably less than 80% of the first threshold value; preferably the second threshold value is increased by at least 20% and more preferably the second threshold value is increased by at least 50%.

INDUSTRIAL APPLICABILITY

At least one embodiment of the present disclosure can be used to determine the operating level of a wind power generator in accordance with current driving conditions and useful life in the field of a wind power generator and a control method thereof.

The invention claimed is:

1. A method of controlling a wind turbine generator, comprising:
   accumulating a cumulative damage degree Du of each evaluation point of the wind turbine generator in a unit period over an entire evaluation period, to calculate a total cumulative damage degree Dt of the entire evaluation period at each evaluation point;
   comparing the total cumulative damage degree Dt at each of the evaluation points calculated by the calculation step with a predetermined first threshold value (P*Q) and comparing an increase rate dDt/dt of the total cumulative damage degree Dt at each evaluation point with a second threshold value to evaluate fatigue of a part to which each evaluation point belongs in the wind turbine generator; and
   determining an operation mode of the wind turbine generator based on an evaluation result of the evaluation step into a normal operation mode when the total cumulative damage degree Dt is less than the first threshold value (P*Q) and the increase rate dDt/dt is less than the second threshold value, and determining the operation mode into a low-load operation mode in which an output is suppressed as compared with the normal operation mode if the total cumulative damage degree Dt is equal to or larger than the first threshold value (P*Q) or the increase rate dDt/dt is equal to or larger than the second threshold value,
   wherein the step of determining the operation mode is performed repeatedly at a determination interval that varies between 1 day and 6 months, wherein after the total cumulative damage degree Dt increases above the first threshold value (P*Q) and the operation mode is changed to the low-load operation mode, the operation mode returns from the low-load operation mode to the normal operation mode when it is determined that the total cumulative damage degree Dt again is below the first threshold value (P*Q) in an upcoming operation-mode determination in which the step of determining the operation mode is performed after the determination interval.

2. The method of controlling a wind turbine generator according to claim 1,
wherein, in the operation mode determination step, a pitch angle of a wind turbine blade is set to be a feather side compared to the normal operation mode when the evaluation point belongs to any one of a top portion of a tower, a bottom portion of the tower, a rotor hub or a rotor blade of the wind turbine generator.

3. The method of controlling a wind turbine generator according to claim 1,
wherein, when the evaluation point belongs to a drive train in the wind turbine generator, the rotation speed of a rotor is limited to be lower compared to the normal operation mode.

4. The method of controlling a wind turbine generator according to claim 1, further comprising:
an acquisition step of acquiring stress change information indicating a time-series change of stress occurring at each evaluation point within the unit period;
a first calculation step of calculating a stress amplitude Fi of stress generated in each evaluation point in the unit period and a repetition number ni of the stress amplitude Fi based on the stress change information acquired in the acquisition step; and
a second calculation step of calculating the cumulative damage degree Du of each evaluation point in the unit period based on a calculation result of the first calculation step and the information of the SN diagram corresponding to the material of each evaluation point.

5. The method of controlling a wind turbine generator according to claim 4,
wherein the cumulative damage degree Du in the second calculation step is calculated based on the following equation (i);

$$D_u = \Sigma \frac{n_i}{N_i} \quad \text{(i)}$$

wherein, Ni is a breaking repetition number corresponding to the stress amplitude Fi.

6. The method of controlling a wind turbine generator according to claim 1,
wherein in the predetermined first threshold value (P*Q), P is the fraction of service life at the time of evaluation of the wind turbine generator, and Q increases in the range of 0.05 to 0.95 depending on the cumulative operation of the wind power generation equipment.

7. The method of controlling a wind turbine generator according to claim 1, further comprising
a rotation speed determination step of setting the operation mode of the wind turbine generator as the normal operation mode when the rotor rotation speed (rpm) is within a noise request level range, and reduce the rotor rotation speed as the rotor rotation speed which falls within the range of the noise request level when the rotor rotation speed exceeds the noise request level range.

8. The method of controlling a wind turbine generator according to claim 1,
wherein the cumulative damage degree Du is accumulated for each range of the stress amplitude in the SN diagram corresponding to the material of each evaluation point.

9. The method of controlling a wind turbine generator according to claim 1, further comprising the step of
determining an operation mode of the wind turbine generator based on an evaluation result of the evaluation step into an enhanced operation mode when the total cumulative damage degree Dt is less than 95% of the first threshold value (P*Q) in which the second threshold value is increased by at least 10%; preferably the enhanced operation mode is entered when the total cumulative damage degree Dt is less than 90% of the first threshold value, more preferably less than 80% of the first threshold value; preferably the second threshold value is increased by at least 20% and more preferably the second threshold value is increased by at least 50%.

10. The method of controlling a wind turbine generator according to claim 1, further comprising the step of calibrating the total cumulative damage degree Dt by
measuring the actual total cumulative damage of the wind turbine generator by a non-destructive technique, and adjusting the total cumulative damage degree Dt to the actual cumulative damage.

11. A wind turbine generator, comprising:
a rotor configured to receive wind energy and rotate,
a generator to which the rotational force of the rotor is transmitted, and
a control system for realizing the control method according to claim 1.

* * * * *